United States Patent [19]

Goodman et al.

[11] 3,763,979

[45] Oct. 9, 1973

[54] ADJUSTABLE HOSPITAL BEDS

[75] Inventors: Robert Goodman, Philadelphia; David G. Kilpatrick, Bala Cynwyd, both of Pa.

[73] Assignee: Goodman Bros. Mfg. Co., Philadelphia, Pa.

[22] Filed: Sept. 14, 1971

[21] Appl. No.: 180,348

Related U.S. Application Data

[62] Division of Ser. No. 889,545, Dec. 31, 1969, Pat. No. 3,598,148.

[52] U.S. Cl............... 192/89 A, 192/67 R, 192/99 S
[51] Int. Cl............................................. F16d 19/00
[58] Field of Search............... 192/89 A, 108, 67 P, 192/67 A, 67 R, 93 A, 99 S

[56] References Cited
UNITED STATES PATENTS

| | | | |
|---|---|---|---|
| 2,092,104 | 9/1937 | Bowden | 192/89 A |
| 1,948,150 | 2/1937 | Witted | 192/67 R |
| 917,312 | 4/1909 | Klemn | 192/89 A |
| 1,300,819 | 4/1919 | Combs | 192/89 A |

*Primary Examiner*—Charles J. Myhre
*Assistant Examiner*—Randall Heald
*Attorney*—Arthur A. Jacobs

[57] ABSTRACT

A coupling means comprising two releasably connectable rotatable shafts in end-to-end relationship, a sleeve overlapping adjacent ends of the shafts, the sleeve having one closed slot at one end and one open-ended slot at the other end, a pin on each shaft, the pin on one shaft being engaged in the closed slot and the pin on the other shaft being movable into and out of the open-ended slot, a spring biasing the corresponding pin into the open-ended slot to couple the shafts together, and selectively operable cam means for moving the sleeve to disengage the corresponding pin from the open-ended slot to uncouple the shafts.

2 Claims, 14 Drawing Figures

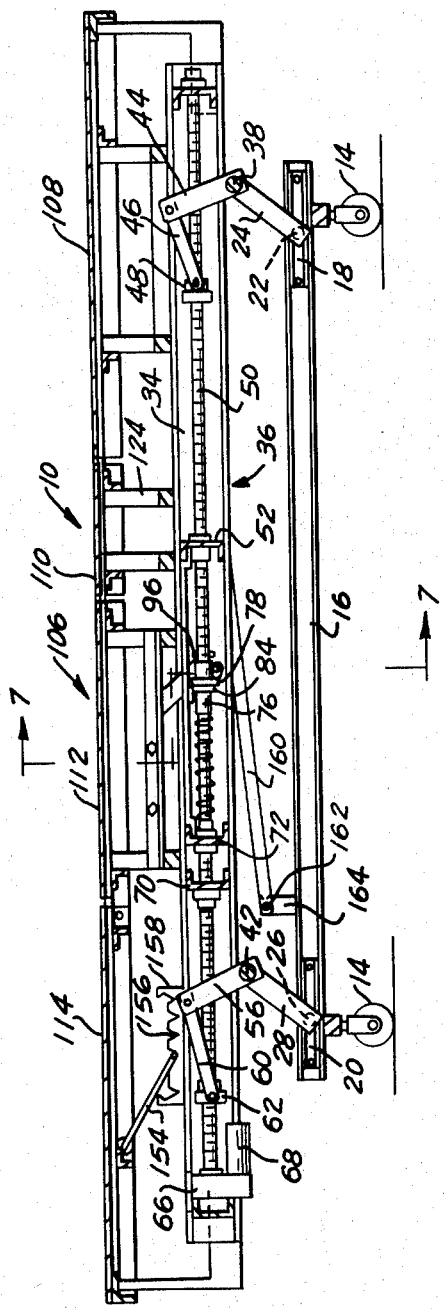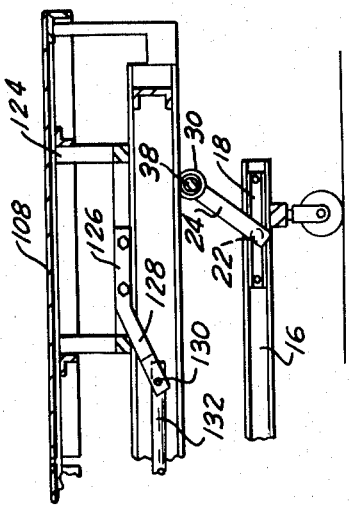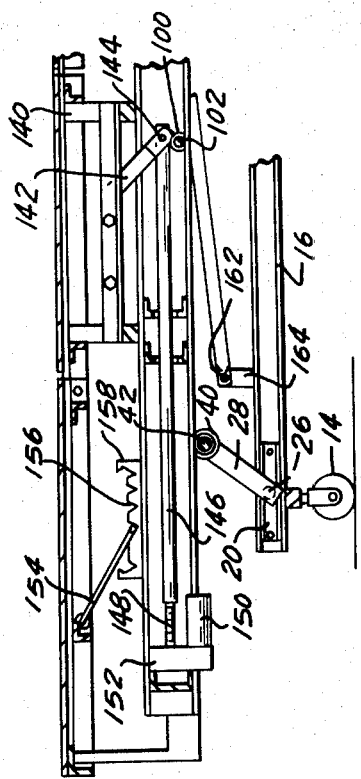
FIG. 4
FIG. 6
FIG. 5

ADJUSTABLE HOSPITAL BEDS

This is a division of co-pending application Ser. No. 889,545, filed Dec. 31, 1969, now U.S. Pat. No. 3,598,148. This invention relates to so-called "hospital beds" wherein parts of the bed are variably adjustable, and it particularly relates to beds of this type wherein the bed is vertically adjustable as a unit and the bedspring consists of relatively articulated sections which are independently adjustable relative to the bed as a whole.

Most prior beds of this type have been adjustable as a unit only by means of telescoping post assemblies at each corner. These post assemblies usually were operated by complicated mechanisms including cables, pulleys, etc. wherein the cables were easily broken or stretched and wherein it was, in any event, difficult to manipulate all four post assemblies to obtain exactly the degree of inclination or vertical adjustment desired. Some attempts were made to substitute linkage assemblies but these linkage assemblies were generally also complicated and cumbersome and could not be utilized to obtain optional inclinations or straight vertical adjustments whenever required.

This type of bed is also usually adapted to be operated by the patient. This requires a simple, yet effective mechanism so that a minimum of effort is necessary on the part of the patient. Mechanical control means have proven to be too complicated, too expensive, and too easily subject to breakdown, so that the patient must not only use undesirable effort but is often unable to make the bed function properly. However, it has been difficult, heretofore, to provide an effective but yet safe electrical control system because of a number of hazards, chiefly the possibility of electrical shock caused by power-line leakage and the possibility of "sparking" in that part of the circuit which may be exposed to a high oxygen atmosphere, as, for example, when the patient is in an oxygen tent, or which may be exposed to flammable fumes present in the atmosphere.

It is, therefore, one object of the present invention to provide a hospital-type bed whereby one end of the bed may be inclined to any position desired or whereby the whole bed may be raised or lowered as a unit either in a completely straight position or when one of the ends is inclined.

Another object of the present invention is to provide a bed of the aforesaid type which is equipped with an electrical control system that is relatively simple and effective but which greatly reduces the hazards of power-line leakage and "sparking".

Other objects and many of the attendant advantages of this invention will be readily appreciated as the same becomes better understood by reference to the following description when read in conjunction with the accompanying drawings wherein:

FIG. 2 is a side elevational view of the bed of FIG. 1.

FIG. 3 is a sectional view taken on lines 3—3 of FIG. 2.

FIG. 4 is a sectional view taken on lines 4—4 of FIG. 1.

FIG. 5 is a sectional view taken on lines 5—5 of FIG. 1.

FIG. 6 is a sectional view taken on lines 6—6 of FIG. 1.

Figure 11A:
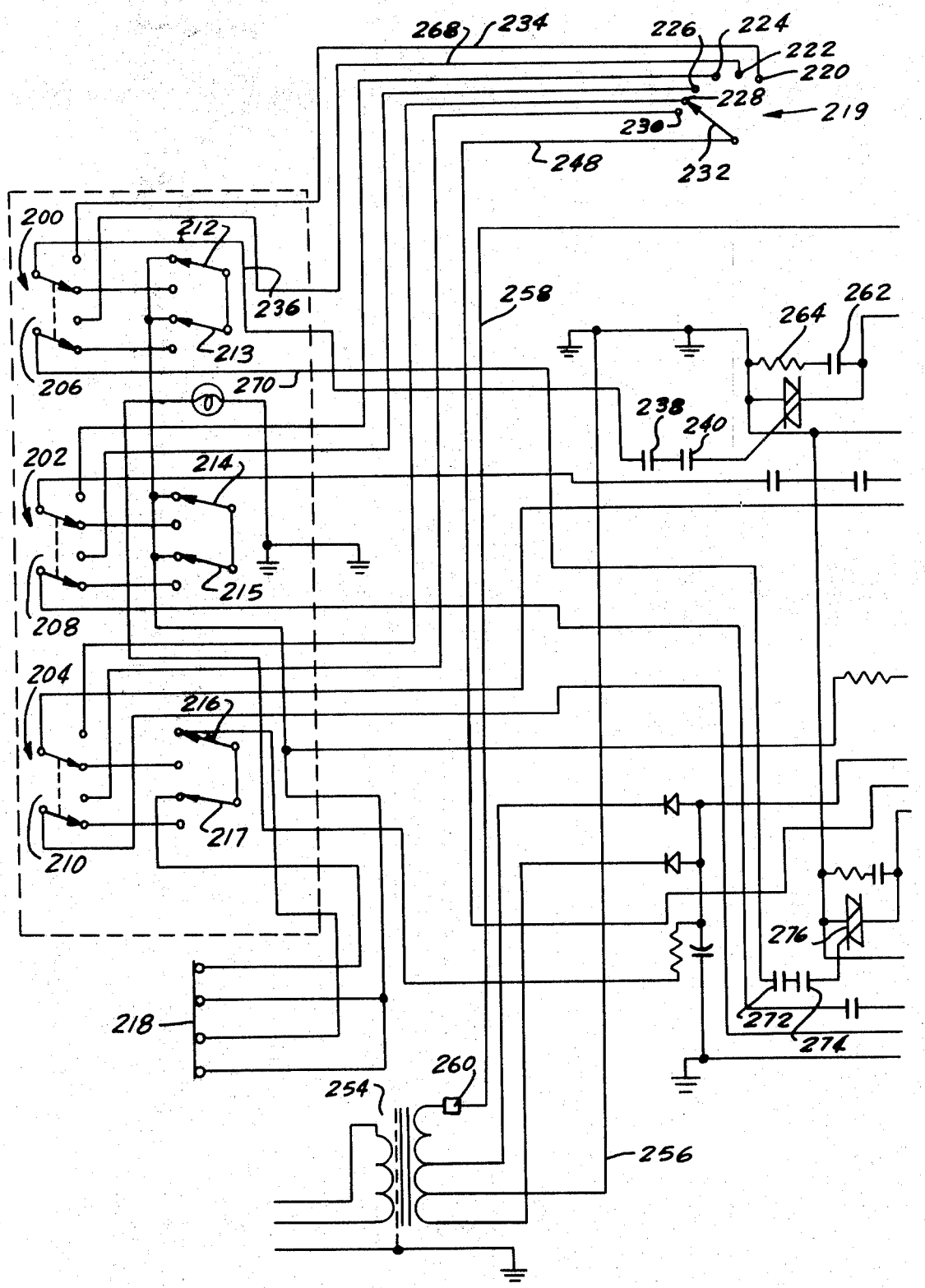
Figure 11B:
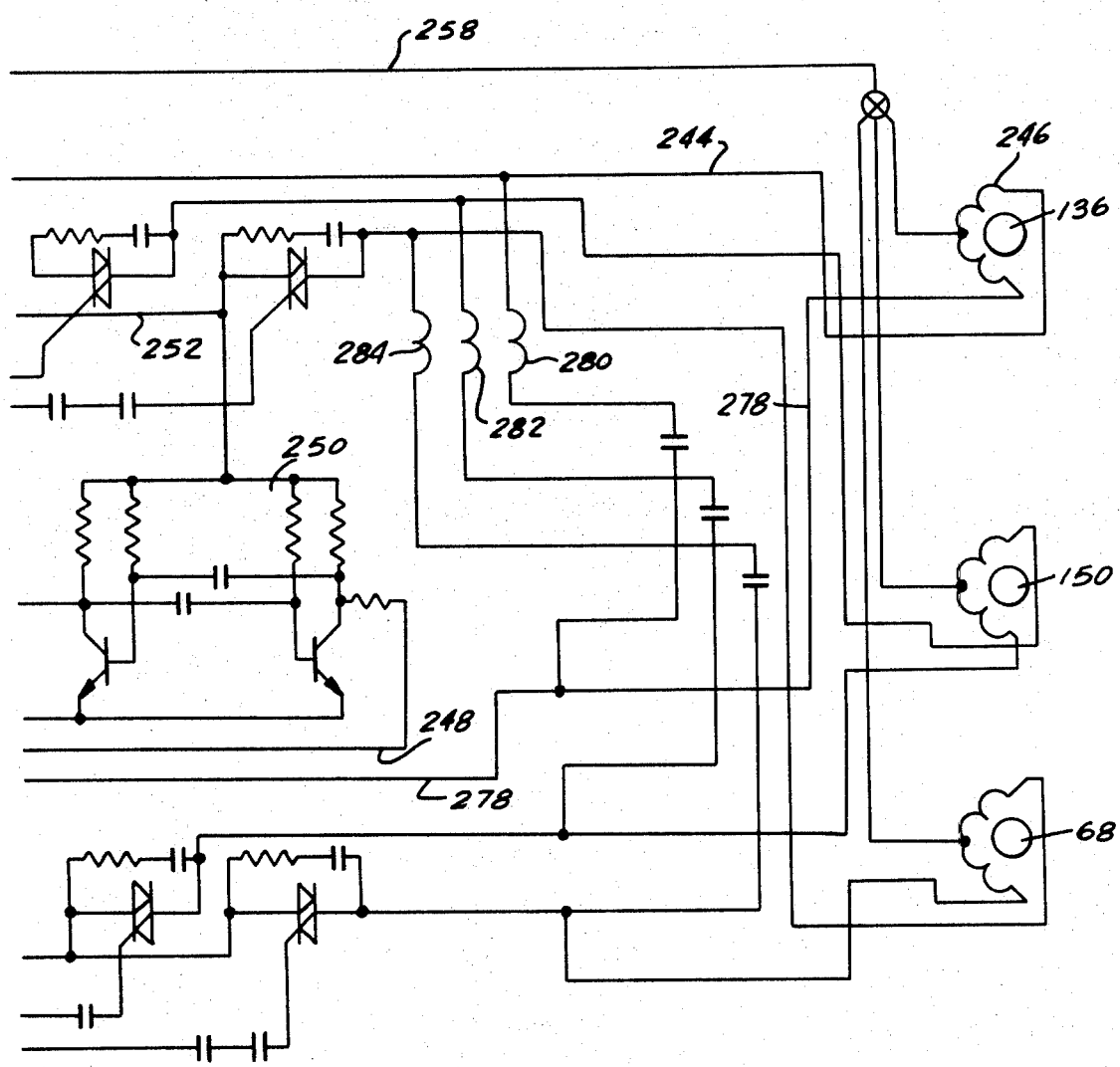

FIGS. 11A and 11B combine to form a schematic view of the electrical control circuit.

Figure 12:
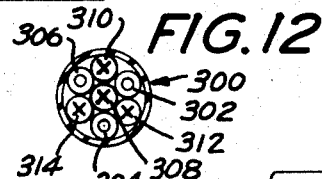

FIG. 12 is a cross-sectional view of the transformer cable.

Figure 13:
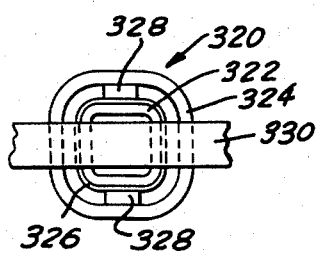

FIG. 13 is a somewhat schematic, cross-sectional view of the transformer.

Referring now in greater detail to the various figures of the drawings wherein similar reference characters refer to similar parts, there is shown a bed, generally designated 10, having a base frame 12 (see FIG. 2) which is supported on casters 14 adjacent each of the four corners thereof. The base frame 12 includes oppositely disposed, parallel angle bars 16, each having on its inner wall, adjacent each end thereof, a guide channel, the guide channels at one end being designated 18 and those on the other end being designated 20.

Figure 7:
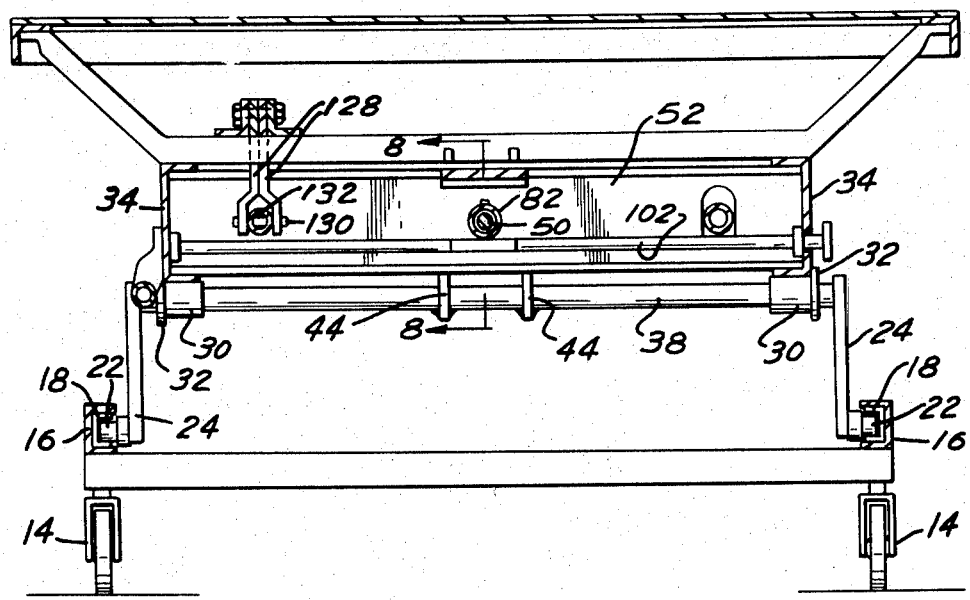
FIG. 7 is a sectional view taken on lines 7—7 of FIG. 4.

Movable within each guide channel 18 is a roller 22 mounted on the lower end of a lever 24. Movable within each guide channel 20 is a roller 26 mounted on the lower end of a lever 28. The levers 24 are each provided with a bearing sleeve 30 having a flange 32. The bearing sleeves 30 (as best seen in FIG. 7) support one end of the undersides of the oppositely disposed, parallel channel bars 34 forming the side railings of the upper frame portion generally designated 36, while the flanges 32 prevent side-slippage. A cross-rod 38 connects the opposite sleeves 30. In similar manner, the levers 28 are each provided with a flanged bearing sleeve 40 connected by a cross-rod 42.

Figure 1:
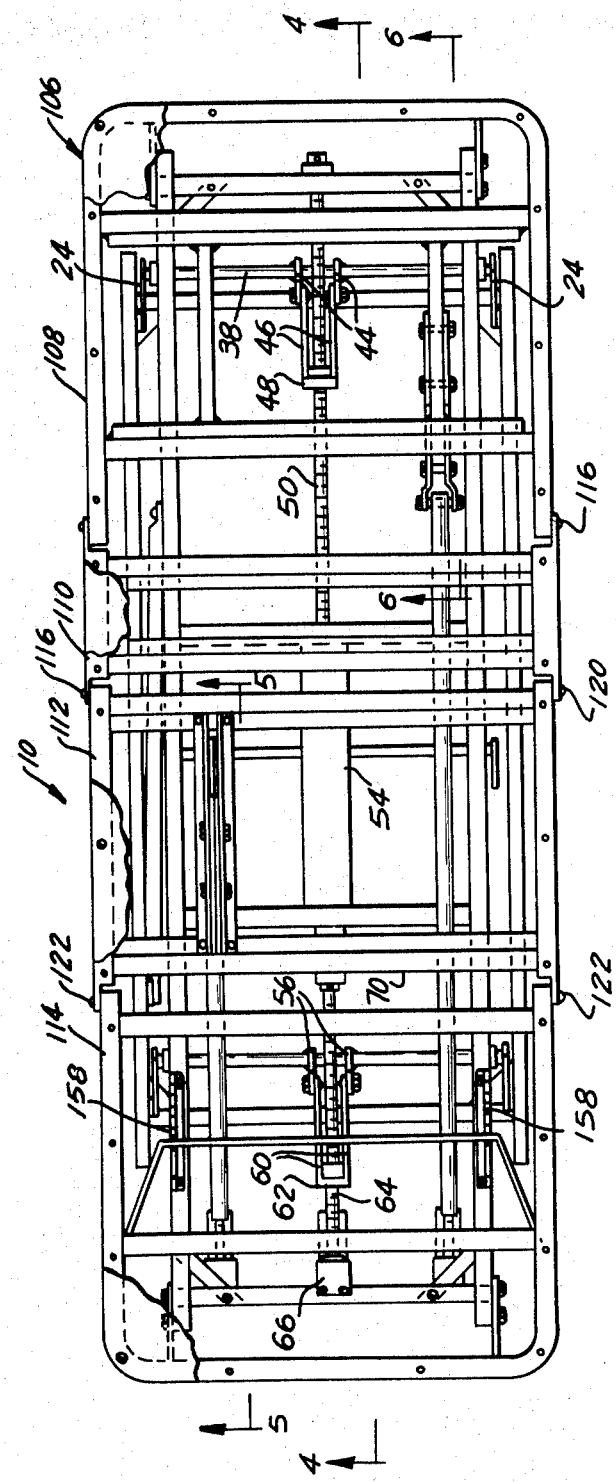
FIG. 1 is a top plan view of a bed embodying the present invention.

Pivotally mounted on the cross-rod 38 are links 44 which extend upwardly and are pivoted at their upper ends to links 46. The links 46 are connected to an internally threaded bushing 48 threadedly engaged with a threaded rod 50 extending longitudinally along the center of the bed. The rod 50 extends through a plate 52 (see FIG. 4) defining one end of a protective housing 54 (see FIGS. 1 and 3). In similar manner, the rod 42 is provided with links 56 pivotally connected to links 60. The links 60 are connected to an internally threaded bushing 62 threadedly engaged with a threaded shaft 64. The shaft 64 is connected at one end to a gear box 66 operatively connected to a reversible electric motor 68. At its other end, the shaft 64 extends through a bearing plate 70 and through an end plate 72 defining the other end of the housing 54.

Figure 8:
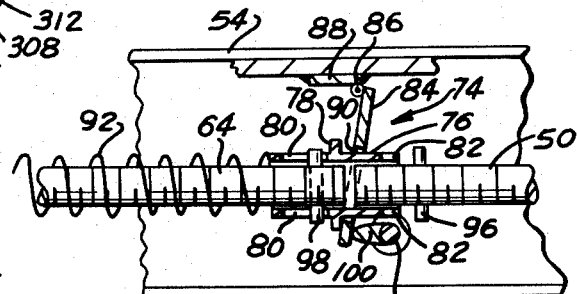
FIG. 8 is a sectional view taken on lines 8—8 of FIG. 7, showing the clutch means in the inoperative position.
Figure 9:
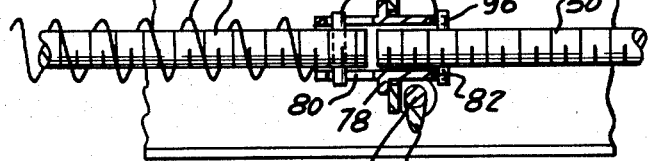
FIG. 9 is a view similar to FIG. 8 but showing the clutch means in the operative position.
Figure 10:
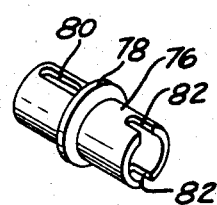
FIG. 10 is a perspective view of the clutch sleeve shown in FIGS. 8 and 9.

Within the housing 54 there is provided a clutch assembly 74 comprising a sleeve 76 that is open at each end and is provided with a central flange 78. In the left-hand portion of the sleeve 76, as viewed in FIGS. 8, 9, and 10, there are provided a pair of opposed slots 80, closed at each end, while in the right-hand portion there are provided a pair of opposed, open-ended notches 82. A plate 84 is hinged at 86 to a plate 88 attached to the upper wall of the housing 54. The plate 84 is provided with an opening 90 through which the sleeve 76 extends. The opening 90 is similar in diameter then the flange 78 and is adapted to abut thereagainst. A coil spring 92 surrounds the shaft 64 within the housing 54, bearing at one end against the sleeve 76 and at the other against a flange 94. The spring 92 thereby normally urges the sleeve 76 to the right, as viewed in the drawings, and, as a result, normally biases the flange 78 into abutment against the plate 84, as shown in FIG. 9.

The shaft 50 is provided with a transverse pin 96 and the shaft 64 is provided with a transverse pin 98. The pin 98 always rides in slots 80, and, in the position shown in FIG. 9, it is pressed against the left ends of these slots. The pin 96 is normally within the slots 82 under the biasing force of the spring 92 and, in such position, acts to couple the shaft 50 to the shaft 64. However, when it is desired to uncouple these shafts, a cam 100 is actuated into the position shown in FIG. 8. In this position, the cam opposes and overcomes the bias of the spring 92 and forces the sleeve 76 to the left. This separates the pin 96 from the notches 82 and uncouples the shaft 50 from the shaft 64. The cam 100 is mounted on a rod 102 which is rotatable by means of a handle 104 (see FIGS. 2 and 3).

By means of the above-described mechanism, either the entire bed may be raised or lowered as a unit, or only one end may be raised to incline the bed and then the entire bed, in the inclined position, may be raised or lowered as a unit. When the entire bed is to be raised or lowered as a unit, the cam 100 is left in the inactive position and the automatic coupling of the two shafts 50 and 64 causes both shafts to rotate as a unit when the motor is actuated. This causes threaded movement of the bushings 48 and 62, in either one direction or the other, depending on the direction of rotation of the motor, on their respective shafts. When the bushings move in one direction they actuate the levers 24 and 28 to move toward the upright position, thereby raising the bed. When the bushings move in one direction they actuate the levers 24 and 28 to move toward the upright position, thereby raising the bed. When the bushings move in the opposite direction, they cause the levers 24 and 28 to move toward the horizontal position, thereby lowering the bed. When only the foot end of the bed is to be raised, the cam 100 is moved into the position shown in FIG. 8. This uncouples the shafts and makes only the shaft 64 responsive to the actuation of the motor. If, after inclination is obtained, it is desired to then raise or lower the entire bed, the cam 100 is set to the position shown in FIG. 9, whereby the shafts are again coupled and both lever systems are actuated simultaneously.

Independently of the vertical position of the bed itself, the various sections of the bed-spring, generally designated 106, are adjustable relative to each other. The bed-spring 106 comprises a head section 108, a seat section 110, a knee section 112 and a foot section 114. The seat section 110 is stationary, the head section 108 being pivoted thereto at 116 while the knee section 112 is pivoted thereto at 120. The foot section 114 is pivoted to the knee section 112 at 122.

Figures 2, 3:
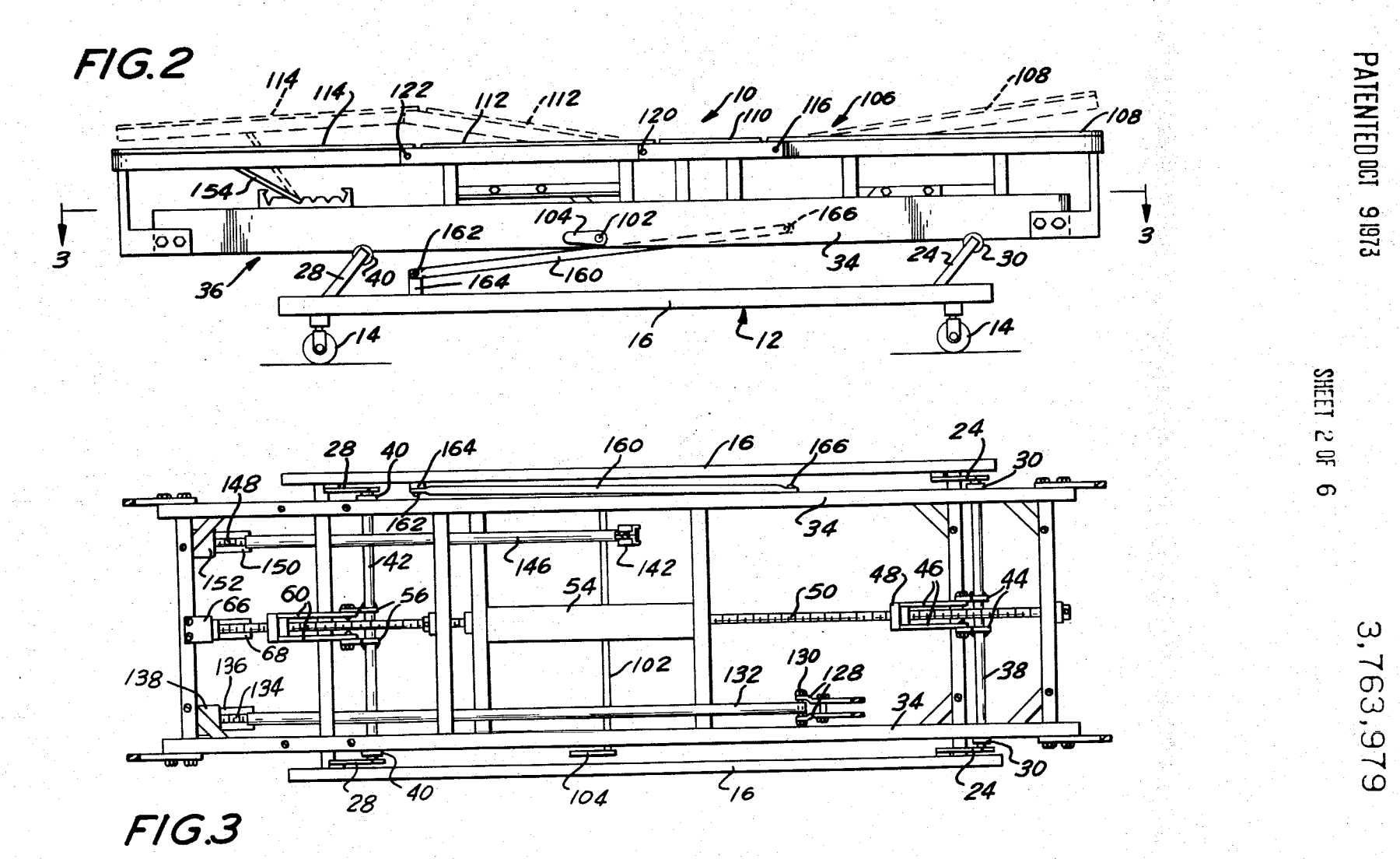

The head section 108 is provided with a dependent bracket 124 to which is attached a bar 126 having offset arms 128 (see FIGS. 3, 6, and 7). The arms 128 are offset at the bottom to pivotally support therebetween, as at 130, the end of a tube 132. The tube 132 is internally threaded and telescopically receives a threaded rod 134. The rod 134 is operatively connected to a reversible motor 136 through a gear box 138. As is readily seen, rotation of the rod 138 in one direction moves the tube 132 toward the right, as viewed in the drawings, to move the arm 128 toward the vertical, thereby raising the head section 108 around the pivot 116. Rotation of the rod 134 in the opposite direction lowers the head section around the pivot.

In similar manner, the knee section 112 has a depending bracket 140 (see FIG. 5) to which are attached arms 142. The arms 142 are pivoted at 144 to one end of an internally threaded tube 146. Extending into the tube 146 is a threaded rod 148 operatively connected to a reversible motor 150 through a gear box 152. Movement of the rod 148 in one direction moves the tube 146 to raise the knee section 112 around the pivots 120 while rotation in the opposite direction lowers it.

As the knee section 112 pivots upwardly, it causes the foot section 114 to move into an inclined position around the pivots 122 (as shown in dotted outline in FIG. 2). In order to maintain this inclined position, a brace bar 154 is hinged to the foot section 114 and may be secured in any one of several notches 156 on a rack 158 to adjust the inclination of the foot section.

A brace bar 160 is pivoted, as at 162, at one end to a post 164 on the corresponding angle bar 16 while at its opposite end it is pivoted, as at 166, to the corresponding side plate 34.

The electrical control system is illustrated in FIG. 11 and comprises three control networks, one for the bedspring head, and generally designated 200, one for the bed-spring foot, generally designated 202, and one for the bed itself, generally designated 204. The operation of all the networks is similar and only one will be hereinafter described since the description of one serves as a description of the others.

The bed is so designed that the nurse or other attendant may either place it in condition where it can only be operated by her or in a condition where the patient can operate it. Furthermore, it can be selectively adjusted so that the patient can operate either all or one or two functions but not the others. This is accomplished by means of a double-throw switch for each network, such as shown at 206 for network 200, at 208 for network 202 and at 210 for network 204. Viewing network 200, for example, there are four contacts alternately labeled P and N. When the switch 206 is moved to the N position, as drawn, only the nurse can operate the bed-spring head. Momentary spring-return switches 212, 213, 214 and 215 and latch switches 216 and 217 are provided for completing the circuit for nurse-operation. The latching switches 216 and 217 hold the bed in the up or down position until reactuated. When th patient is to operate the control system, the double-throw switch is moved to the P positions.

A limit switch assembly is shown at 218, and includes two switches, one being for upward movement and the other for downward movement. This switch assembly opens the respective circuits to the network 204 when switch 210 is in the N position, in accordance with predetermined upper and lower limits of movement of the corresponding bed portion.

This limit switch assembly permits the nurse or other attendant to actuate whatever network is desired and then go on to other things.

Using the network 200 as illustrative of all three networks, with the switch 206 on patient-control, the patient control assembly, generally designated 219, is in the circuit for control of bed-spring head position. This patient-control assembly comprises six-contacts 220, 222, 224, 226 and 230 in the assembly. A switch contact 232 is movable by the patient to selectively engage each of the contacts 220 to 230. Contacts 220 and 222 respectively control the up and down positions of the head network 200, the contacts 224 and 226 respectively control the up and down positions of the foot network 202, and the contacts 228 and 230 respectively control the up and down positions of the bed network 204.

As is clear from FIG. 11, when the contact 232 is in engagement with contact 220, a control circuit is established from contact 220 through line 234, through the upper contact of switch 206, through line 236, through a pair of series-connected capacitors 238 and 240, to the control gate of Triac 242, turning on Triac 242, and completing the power circuit through line 244 to the high side of the motor winding 246 of the motor 136 from the power ground 256.

The control circuit from the contact 220 is completed through contact 232, through line 248 to an astable multivibrator 250, then through line 252 to the power ground or power input terminal of Triac 242.

The power circuit for the motor 136 is from the secondary of the transformer 254 though the line 256, the Triac 242, the line 244, the motor winding 246, the line 258, the protective thermal cut-out 260, and back to the secondary of the transformer 254.

The Triac 242 is provided with a capacitor 262 and a resistor 264 that serves as a voltage-phase compensating network to prevent the inductance of the motor winding from misfiring the Triac.

The astable multivibrator 250 is operated at a frequency of more than 1,000 times the power line frequency of 60 cycles per second. A Triac device does not have the isolation between the control circuitry (gate) and the power circuitry that is in herent in an ordinary relay, i.e., between the coil circuitry and the power contact circuitry. By controlling the Triac device with high frequency, we take advantage of low impedance through capacitors 238 and 240 at the control frequency generated by the astable multivibrator 250 and the high impedance through capacitors 238 and 240 at power line frequency.

The capacitors 238 and 240 are an effective safety feature. During normal operation, the reactance at 70 kc is a few hundred ohms. In the event of a Triac terminal Two (output terminal) to gate fault, the reactance of these capacitors is several hundred kilohms at 60 cycles per second. The high 60 cycle series impedance effectively limits the 60 cycle current to approximately 0.45 milliamperes. In this manner, there is provided an inherently very low energy control circuit through patient-control assembly 219, and networks 200, 202, and 204 under all circumstances of possible failure of components, so that only low current can flow through the line 236 to the control assembly 219.

The use of two series-connected capacitors 238 and 240 is an additional safety feature because if one of the capacitors should, for some reason, short out, the other would still be operative for the intended purpose.

If the reverse actuation of the motor 136 is desired, the contact 232 is engaged with contact 222, at which time the circuit is established through line 268, through the lower contact of the switch 206, through the line 270, through the two capacitors 272 and 274, to the control gate of Triac 276, turning on Triac 276 and completing the circuit through line 278 to the low side of winding 246 from the power ground.

An inductive resistance means is provided for each network, such means being indicated at 280, 282, and 284. These inductive resistances (a resistor wound around a magnetic core) serve to limit peak current and rate of rise of current to the respective Triacs.

Since the networks 202 and 204 are connected to their respective motors 158 and 68 in the same manner as network 200 is connected to motor 136, the above description of network 200 serves also as a description of the other two networks.

The cable and transformer should be of special construction in order to reduce leakage between the high side of the line and the frame of the bed to no more than about 5 micro-amperes. At these very low levels of leakage, the leakage current is almost completely due to capacitive coupling rather than to imperfect insulation.

The cable construction 300 is indicated in FIG. 12 and comprises three insulated copper-conducting strands 302, 304 and 306, the first being the "high", the second being the "common", and the third being the "ground" lines. The strands 308, 310, 312 and 314 are the fillers. The conducting lines or primaries 302, 304 and 306 are FEP (Teflon) insulated. The fillers 308, 310, 312 and 314 are strands of flame-retardant polyethylene. Both the FEP and the polyethylene have relatively low dielectric constants while having high insulating properties. The outer jacket is vinyl. The total diameter over the vinyl jacket is about 0.4 inches. This construction permits very low cable capacity between high line and ground conductors.

In order to achieve low capacity between the transformer primary and the frame of the bed, the transformer 320, shown in FIG. 13, provides the primary on the outside rather than the inside. As shown, the secondary winding which is tied electrically to the frame of the bed, is designated 322, and the primary winding is designated 324. A grounded copper foil shield 326 is provided between the primary and secondary windings. Low dielectric-constant spacers 328 are provided between the foil shield 326 and the primary winding. These spacers may be constructed of hard wood which has been vacuum-impregnated with varnish. The whole assembly is mounted in a conventional laminated frame 330.

The invention claimed is:

1. A coupling means for releasably connecting two rotatable shafts comprising a sleeve, said sleeve overlapping both shafts, said shafts being aligned in end-to-end relationship, said sleeve having a closed slot and an open-ended notch spaced longitudinally from said slot, a first transverse pin on one of said shafts, said pin being engaged in said slot, and a second transverse pin on the other of said shafts, said second transverse pin being releasably engaged in said notch, biasing means urging said sleeve into a position wherein said second pin is engaged in said notch, and cam means operatively engageable with said sleeve to move said sleeve in a direction to overcome the force of said biasing means and move said notch out of engagement with said second pin.

2. The coupling means of claim 1 including an apertured, hinged plate through the aperture of which said sleeves extends, said sleeve having a peripheral flange extending radially outward therefrom, said flange being in abutment with said plate and adapted to hingedly move said plate under the force of said biasing means, and said cam means comprising a rotatable cam which is rotatable into and out of engagement with said plate, said cam being constructed and arranged to hold said plate against said flange in fixed position against the force of said biasing means.

* * * * *